US005822342A

United States Patent [19]

Suzuki et al.

[11] Patent Number: 5,822,342

[45] Date of Patent: Oct. 13, 1998

[54] METHOD OF FORMING A PLASMA MICRO-UNDULATOR

[75] Inventors: Yasuo Suzuki; Ryoji Nagai, both of Tokai-Mura; Naoyuki Sato, Hidachi; Takashi Ikehata, Hidachi; Hiroshi Mase, Hidachi; Yoshihiro Sadamoto, Joetsu, all of Japan

[73] Assignee: Japan Atomic Energy Research Institute, Tokyo, Japan

[21] Appl. No.: 634,349

[22] Filed: Apr. 18, 1996

[30] Foreign Application Priority Data

Jul. 17, 1995 [JP] Japan .................................... 7-210922

[51] Int. Cl.[6] ........................................................ H01S 3/00

[52] U.S. Cl. ...................................................... 372/2; 372/2

[58] Field of Search .................................................... 372/2

[56] References Cited

U.S. PATENT DOCUMENTS 5,020,061 5/1991 Etievany et al. ............................ 372/2

OTHER PUBLICATIONS

Bekefi et al; "Stimulated Raman scattering by an intense relativistic electron beam subjected to a rippled electric field";J. Appl. Phys. 50(8),Aug. 1979.

*Primary Examiner*—Leon Scott, Jr.
*Attorney, Agent, or Firm*—Oblon, Spivak, McClelland, Maier & Neustadt, P.C.

[57] ABSTRACT

Undulator is a device which produces a high intensity synchrotron radiation having narrow band width by making a relativistic electron beam undulate in an alternating magnetic field. It is possible to form a plasma micro-undulator which is very compact (size <1 cm) and by which a short-wavelength synchrotron radiation (visible to X-ray) can be produced, by illuminating a variable wavelength laser to a vapor atom generated from a high temperature evaporation source, at that time interfering two laser beams having the same wavelength to form an optical interference fringe and adjusting the wavelength of laser beam to the excitation energy of atom and producing a regular plasma-density-ripple corresponding to the light and shade of optical fringe by the multiple-step ionization scheme (resonance ionization).

3 Claims, 6 Drawing Sheets

METHOD OF FORMING A PLASMA MICRO-UNDULATOR

BACKGROUND OF THE INVENTION (1) Field of the Invention

The present invention relates to a method of forming a plasma micro-undulator.

(2) Description of the Prior Art

The undulator is a device which produces a high-intesity synchrotron radiation which is narrow in wavelength spectra by injecting a relativistic electron beam in an alternating magnetic field generated by an array of permanent magnets.

When the undulator is combined with a light resonator a free electron laser may be realized.

The free electron laser is a light source having such excellent characteristics as high generating power, high brightness, tunability of wavelength, high efficiency and long life; so that, in recent years, have attracted great deal of attention not only in scientific research but also in industrial application such as processing of semiconductor devices, separation of isotopes, treatment of radioactive wastes and medical treatment.

The wavelength of undulator radiation is in proportion to the periodic length of magnetic field and in inverse proportion to the square of the energy of electron beam.

DETAILED DESCRIPTION OF THE PREFERRED EMBODIMENT

Figure 1:
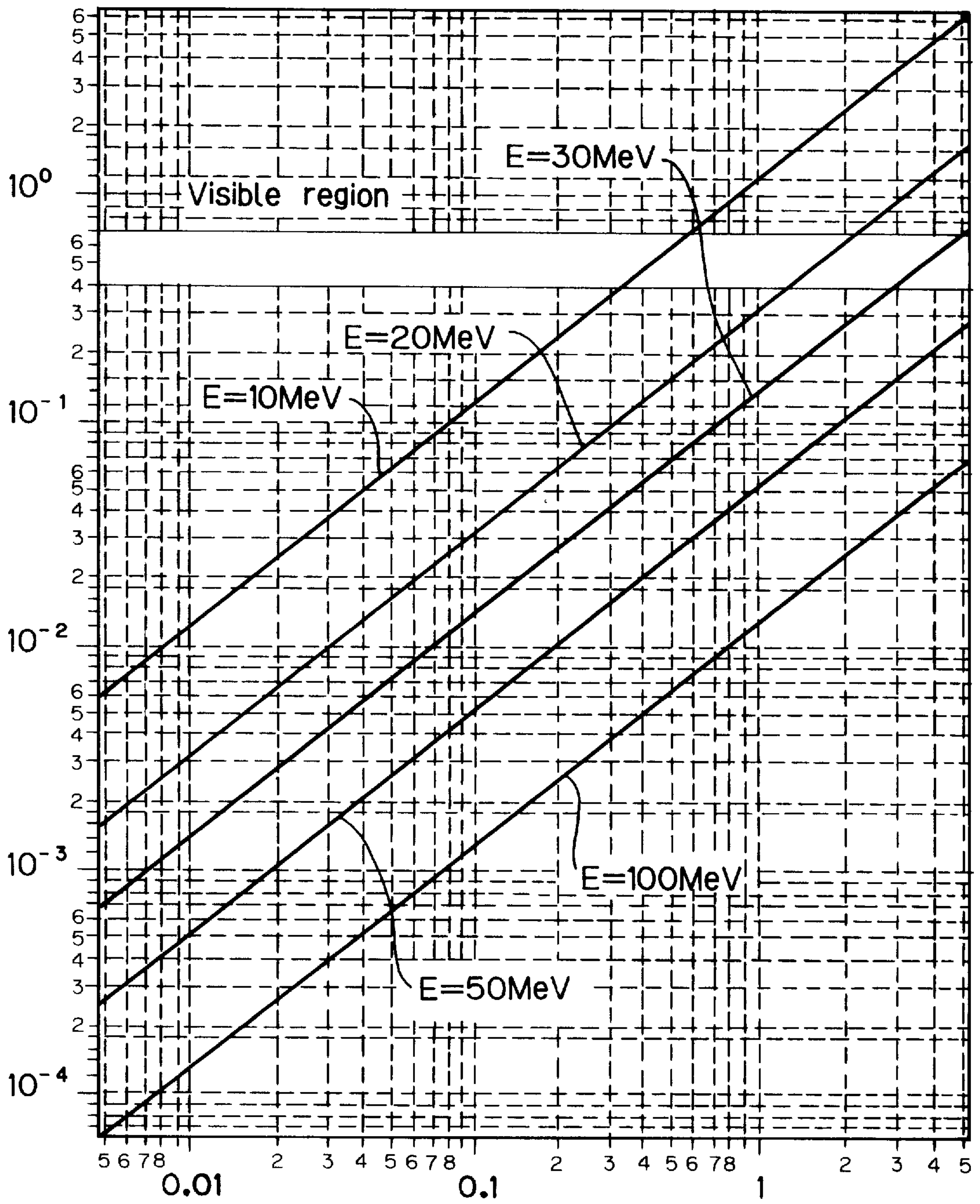
FIG. 1 is a graph showing the relation of periodic length of undulator and wavelength of synchrotron radiation.

Using the energy of electron beam as a parameter the relation of the wavelength of synchrotron radiation to the periodic length of undulator is shown in FIG. 1.

In FIG. 1, the ordinate is wavelength ($\mu$m) of synchrotron radiation and the abscissa is periodic length (mm). For example, in order to realize a light of visible to ultraviolet wavelength with 20 MeV of electron energy, about 1 mm of periodic length is needed.

If 1 $\mu$m of periodic length can be realized, a soft X-ray of about 3 nm in wavelength will be obtained.

But, in the present method using a permanent magnet it is difficult in principle to make the periodic length below 10 mm. [ibid. 1st Ed. The base of synchrotron radiation].

Necessarilly, the beam energy increases and so the accelerator must become large scale.

Recently, as an epoch-making means of solving these problems a plasma micro-undulator has been proposed. [R. Fedele, G. Miano, V. G. Vaecaro:Phys.Scr.T30(1990)192; K. R. Chen, J. M. Dawson:Phys.Rev.Lett.68(1992)29; Yasuo Suzuki: Nuclea Fussion Research 68(1992)488]

The plasma micro-undulator is a device in which a relativistic electron beam is injected into a plasma having periodical density distribution (density ripple) to undulate an electron in near-sinusoidal electric field of ion space charge induced and therefore, there is a possibility of realizing a short-wavelength light source which is remarkably compact in comparison with the magnetic field type.

Mr. Yasuo Suzuki who is one of the present inventors has before invented a method of producing a light source of high brightness which comprises a number of thread type plasmas on a plane by a parallel or antiparallel electric current and undulates an electron beam by a periodical magnetic field distribution and/or periodical electric field distribution produced thereby.

[Japanese Patent Appln. No. 188531/1992]

Furthermore, it is expected to realize a periodical plasma density ripple or plasma slab with the periodic length below 1 mm and the number of period above tens.

A method of forming a plasma density ripple in which a laser or electron beam has been injected into a plasma to excite a wave motion for modulating the plasma density has hitherto been proposed. However, this method has a problem that control is extremely difficult because of the periodic length depending directly upon plasma parameter such as density, etc. and containing complicated non-linear effect.

An object of the present invention is to dissolve such problem to provide a new method of forming a plasma density ripple using laser.

Furthermore, the object of the present invention is to provide a method of forming a plasma micro-undulator which is extremely compact (size <1 cm) and by which a short-wavelength synchrotron radiation (visible to X-ray) can be produced.

As the result of a further research for achieving this object, the present inventors have thought of employing laser interference technique together with plasma production by laser resonance ionization, and then, have known that, in case of producing a plasma by photoionization by irradiating a laser beam to a neutral gas, and if optical fringes are formed by interfering two laser lights which are the same in wavelength, a regulated plasma-density-ripple is produced by the laser resonance ionization method corresponding to the light and shade of fringe, i.e. the magnitude in photon density. Since the periodic length of ripple is determined purely by optical parameters and the plasma density is in porportion to laser power and neutral gas density, the both can be easily controlled; and furthermore, reflecting high spatial coherence of laser light, it is especially excellent in regularity of ripple; and thus, the present invention has been attained on the basis of this knowledge.

Now, the present invention will be explained on an embodiment for realizing a plasma micro-undulator of 10~100 $\mu$m in periodic length and 100~1000 in number of periods.

First of all, the outline of plasma micro-undulator will be illustrated on figure.

Figure 2:
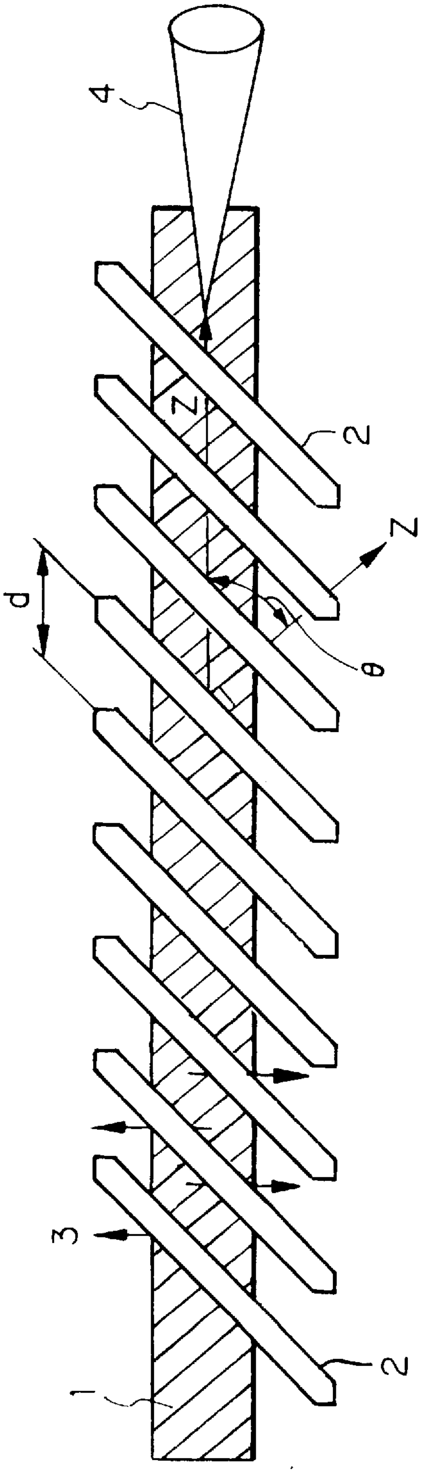
FIG. 2 is a drawing illustrating the outline of plasma micro-undulator.

In FIG. 2, 1 shows a relativistic electron beam; 2 is a plasma density ripple; 3 is a force by an alternating electric field; 4 is undulator radiation. And Z shows the direction perpendicular to plasma plane; z is the direction of electron beam.

When the relativistic electron beam 1 is injected diagonally (at an angle of θ) into the plasma density ripple 2 of d (m) in periodic length [K. R. Chen, J. M. Dawson: Phys. Rev. Lett.68(1992)29], plasma electrons are removed and an alternating electric field 3 transverse to the beam direction as shown by an arrow is produced by the space charge of ions left behind. The electron undulates by the static electric force of this alternating electric field 3 and an undulator radiation 4 is produced.

The plasma density ripple 2 is given by $$n=n_o(1+\sin kZ),\ k=2\pi/d \quad (1)$$

The relativistic electron beam is by γ times heavier than the plasma electron is forced out from its orbit. Here n is the plasma density, $$\gamma=(1-\beta^2)^{-1/2},\ \beta=v/c$$

Two types of response therefor are considered according to the magnitude of density.

A) $n_b>n_o$ (space charge regime):

Here, $n_b$ is the density of an electron beam.

By passage of the electron beam all plasma electrons are removed and the electron beam runs through the remaining ion density ripple and the beam electron undulates by the transverse component of an alternating electric field as follows:

$$F_x=-eE_x=-e^2n_0\delta_u \cos K_uz.\ \sin n\theta/k_u\epsilon_0, \quad (2)$$

where, $\delta_u=\delta\cos\theta$ $k_u=k\cos\theta=2\pi/\lambda_u$ $\lambda_u=d/\cos\theta$ It is necessary to note that the periodic length $\lambda_u$ of alternating force which the electron feels becomes 1/cos θ times as much as the periodic length d of ripple since the electron beam injects at an angle of θ into the ion ripple.

In a typical case of θ=45°, it becomes $$\lambda_u=\sqrt{2}\ d.$$

B) $n_b<n_o$ (image charge regime):

The ratio of plasma electrons removed by the electron beam is so small that the plasma is kept neutral.

In this case, if the plasma is regarded as a perfect conductor, and the electron beam passes through ripples, a positive image charge is induced on the surface of plasma and an alternating static electric force is produced between these image charges and beam negative charges.

The wavelength of synchrotron radiation from a magnetic field type of undulator is given on the axis of beam by the following formula:

$$\lambda=\lambda_u(1+K^2)/2n\gamma^2 \quad (3)$$

Where, n is the order of harmonics; and $\lambda_u=2\pi/K_u$ is periodic length of magnetic field.

K is an important undulator coefficient which is shown as follows:

$$K=ee\ B_s\lambda_u/2\lambda m_sc^2=93.4\lambda_u(m)B_s(T) \quad (4)$$

Generally, in K<1 it is refered to an undulator and in K>1 it is refered to a wiggler.

In K>1, the spectrum of synchrotron radiation contains high frequency component and becomes wide, but, in K<1, the fundamental component dominates.

And since the anglar dispersion σ of synchrotron radiation is shown as follows:

$$\sigma=[1/\gamma][1+K^2/2]^{1/2}/[2\ n\ N]^{1/2} \quad (5)$$

where N is the number of period of magnets, it becomes very small for K<1. That is, the undulator radiation has such excellent properties as the strong directionality and and the narrow spectrum.

On the other hand, since the radiation intensity is in proportion to $K^2$, it is not practical to take K extremely small.

In the present invention, it alas at 0.1<K<1 of plasma undulator.

The plasma undulator may be considered as a version where Lorent force $ecB_0$ is replaced by an electrostatic force $-eE_o$ of the space charge in the formula (4) of K.

Now the outline of the formation of interference fringe by the laser light will be illustrated in a drawing.

Figure 3:
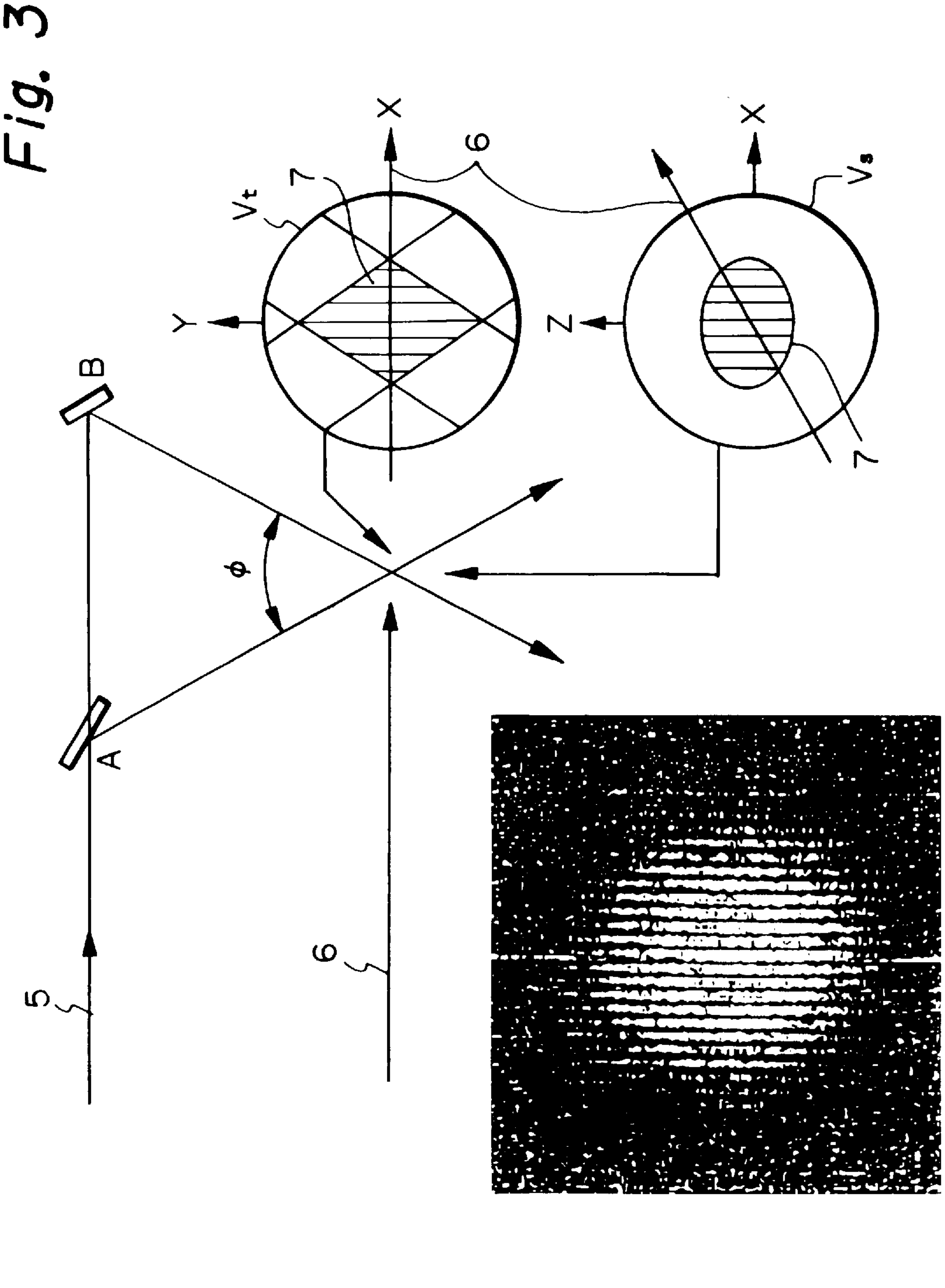
FIG. 3 is a drawing illustrating the formation of optical fringe by interfering two laser lights.

In FIG. 3, A is a half mirror; B is a full reflection mirror; 5 is a laser beam; and 6 is an electron beam.

When laser beams 5 are reflected by the half mirror A and full reflection mirror B and crossed, an interference fringe appears in the intersecting region.

The crossing angle ϕ is changed by adjusting the angle of half mirror A and full reflection mirror B. That is, when reflecting the laser beam 5 of single wavelength by the half mirror A and full reflection mirror B to divide it into two laser beams of the sane intesity and crossing at small angle (below a few degree) an interference fringe 7 appears.

$V_T$ is a view of interference fringe from the upper of paper face in which x-direction is the direction perpendicular to plasma plane and is on paper face, y and z are axis crossing at right angle to each other and the direction of z is perpendicular to paper face. Incidentally, the x direction corresponds to the arrow Z in FIG. 2.

$V_S$ is a lateral view of interference fringe in which the electron beam 6 penetrates from the lower to the upper and the arrow 6 corresponds to z in FIG. 2.

Since, when introducing a suitable neutral gas into this region, a plasma is produced in proportion to photon density, a regular plasma-density-ripple corresponding to the light and shade of interference fringe is formed.

Now, when two laser beams are represented as a plane wave $$U_1(k_1)=U_0e^{j(kr-t)} \quad (6)$$
$$U_2(k_2)=U_0e^{j(kr-t)}$$
$$k_1k_2=k^2\cos\phi$$

respectively, since the light intesity 1 after interference becomes $$1=|U_1+U_2|^2=1_0\ [1+\cos\ (2\ kx\ \sin\phi/2)]1_0=|U_1|^2+|U_2|^2=2\ U_0^2,\ \text{(Initial laser intensity)} \quad (7)$$

the periodic length d(m) of interference fringe is shown by the known formula $$d=\lambda_L/2\ \sin\ (\phi/2)\ (\lambda_L;\ \text{laser wavelength}) \quad (8)$$

Herein, an important point is that the periodic length d can be controlled by the both of laser wave length $\lambda_L$ and crossing angle θ. However, as described later, in the production of plasma by the resonance ionization, since the laser wavelength is fixed according to an energy level utilized, it is convenient to control the periodic length by angle ϕ only.

Figure 4:
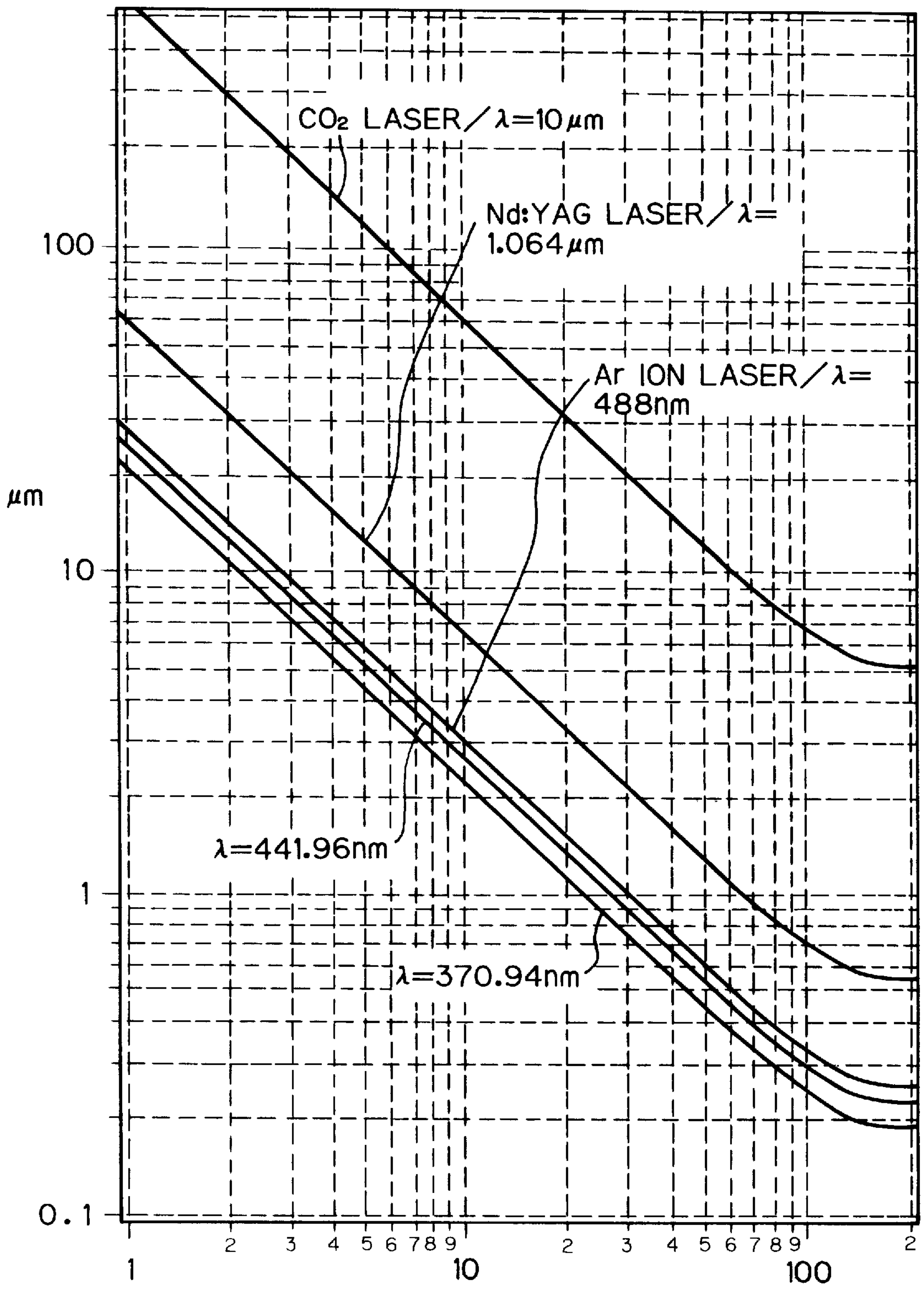
FIG. 4 is graph showing the relation of crossing angle $\phi$ of laser beam and periodic length d of optical fringe.

The relation of crossing angle ϕ and periodic length d for the typical laser wavelength is shown in FIG. 4. In FIG. 4, abscissa is crossing angle ϕ of laser light and ordinate is periodic length d (μm) of interference fringe.
For example, when crossing a laser beam of 370.9 nm in wavelength, we have $\phi=2^0$, d=10 μm.

Recently, a method of applying a laser interference fringe to an apparatus for measuring the beam diameter of high energy electron beam has been proposed [T. Shintake: Nucl. Instrum. Methods A 311(1992)453; T. Shintake: Parity 8 (1993)46].

A photograph put in FIG. 3 shows an interference fringe of 200 μm in periodic length formed using YAG laser (λ=1.064 μm) by preferred method.

In case of changing the crossing angle ϕ to adjust the periodic length, and fixing the distance $l_{AB}$ between the mirrors A/B, the distance l to the interference region changes as $$l=l_{AB}/2\tan(\phi/2) \tag{9}$$

and the electron beam is out of the interference region.

For fixed l the angle and the distance $l_{AB}$ have to be changed simultaneously. Therefore it may be $$\phi_A=\pi/4-\phi/4 \quad \phi_B=\pi/4+\phi/4 \quad l_{AB}=2l\tan(\phi/2). \tag{10}$$

The size of interference region depends upon the diameter D of laser light and pulse length L.

In case of typical long pulse (L>D) the effective volume $V\approx D^3$. Therefore, the number of period N of density ripple and the pulse width $\tau_L$ become $$N=D/dm\sin(\phi/2)2L/\lambda_L \tag{11}$$

$$\tau_L=L/c\ [>D/c] \tag{12}$$

respectively.

On the other hand, for short pulse (L<D), the interference region becomes a plate of L/sin (ϕ/2) in depth.

$$N=Ld/\sin(\phi/2)=2L/\lambda_L \tag{13}$$

$$V=D^2L/\sin(\phi/2) \tag{14}$$

Generally, the laser light transmitting through a free space has a Gaussian intensity profile ($\propto\exp(-r^2/r_0^2)$) [Koichi Shimoda:Introduction to laser physics (Iwanami Shoten) 1983 P62]. In this case, the intesity of interference fringe is different between the central part and the periphery part of interference region.

In order to realize a plasma micro-undulator uniform in density, it is necessary to cut out a central portion ($r<r_0$) only and use it.

Till now the interference of parallel beam of light has been considered, however, when focusing one laser light ($U_2$) by a concave mirror having a long focal distance, it becomes the interference of plane wave and spherical wave and the pitch of interference fringe changes spatially.

This coordination is possible to be applied to a taper undulator by controlling the periodic length spatially. However, also the interference fringe by the interference of plane wave and spherical wave does not become a plane but a spherical surface.

In case of injecting an electron beam obliquely as in the plasma micro-undulator, the crossing angle θ of beam and plasma density ripple changes along the beam orbit and therefore an inconvenience is possible to be caused. However, also in this case, if letting the spatial modulation rate δln (d) of periodic length to an practical order of 1%, it is considered that the above effect can be neglected.

In case of focusing two laser lights, the above effect is especially remarkable.

Production of Plasma by Laser

The plasma density ripple is formed by introducing a neutral gas into the laser interference region. In case of comparing with the prior method by electric discharge, the plasma formation method using a laser has such merits that a plasma isolated spatially and electrically can be produced without current; the electron temperature is such lower and a plasma with uniform density can be obtained.

Herein, especially it will be investigated to heat a heavy metal to evaporate and introduce it as a supersonic stream of metal vapor.

The merit of using the stream of metal vapor is as follows:

(1) In case of usual gas, since non-ionizing components diffuse in the interior of vacuum vessel, it is afraid for the gas to flow into a super high vacuum system such as an accelerator and so a large scale of differential pumping system for exhausting gasses is required. In contrast to this, in the stream of metal vapor, since non-ionizing components stick onto the wall of vessel (water-cooled) to solidify, the vacuum system is not affected thereby.

(2) A supersonic vapor stream can be produced at low temperature by devising the vapor source. In this case, the dimensions of vapor stream (after all, it is the dimensions of plasma) can be adjusted by setting up an aperture just in front of the interference region. The ionization by laser light can be caused in the outside of interference region too. Since the plasma produced in the outside of interference region has naturally not any periodic structure, it is important to limit the vapor stream beforehand to smaller diameter than the dimension (=D) of interference region.

(3) Since most of metal elements are solid in room temperature, wide range of elements can be selected.

(4) Especially, as a merit of using a heavy element, in the plasma micro-undulator, it is necessary that the periodic structure of ion space charge is maintained during the interaction with a relativistic electron beam and therefore the larger the mass of ions the better it is. And also, since for the hevier metal the ionization energy tends to become lower, it is easier to be ionized.

As a method of ionizing these vapor atoms efficiently by a laser light to obtain a high density plasma, the following two methods are investigated.

A plasma parameter assumed herein is d=10~100 μm in periodic length, $V=D^3$~(a few mm)$^3$ in volume and $10^{14}$~$10^{15}$ cm$^3$ in density.

Now, the resonance ionization method used in the present invention will be explained.

This is the most suitable method as an ionization method of plasma micro-undulator, which has been adopted because, the interference fringe is required to be sigle period and statonary.

This method has been researched and developped for the purpose of ionizing the desired isotope selectively and separating it to enrich in the laser separation of isotopes.

The ionization energy $U_i$ of element is 3.9 eV in minimum in cesium and large as 5~10 eV in heavy elements and the resonance wavelength is within the vacuum ultraviolet domain as 120~250 nm.

It is difficult to obtain a large power of variable wavelength laser in such short wavelength domain.

Then, if shifting an electron revolving along the orbit in an atom to a large state of orbit, i.e. a higher state of energy with one photon so as to be easier to ionize and, thereafter, exiting with another photon (ionizing, i.e. releasing electron from the orbit around atom) once more, the electron can be ionized with two photons of relatively longer wave length.

The case of using two photons of the same wavelength is called "one-wavelength two-step ionization". The resonace ionization method Is nothing else but the method of selecting this wavelength so that the first excitation is easier to occur.

In the basic research of laser isotope separation, a scheme of one-wavelength multi-step ionization for ionizing a vaporized metal atom, such as gadolinium, neodymium, etc. has been developped. [Shibata et al:JAERI-M-90-162 (1990); JAERI-M-94-025(1994)].

Thereby the laser output of relatively long wavelength can be reduced sharply. As example there are:

| | | |
|---|---|---|
| $Gd(M = 15.72\ \ U_i = 6.15\ \text{eV})$ | $\lambda_L = 575.19$ nm | 3 steps |
| | $\lambda_L = 370.94$ nm | 2 steps |
| $Nd(M = 144.2\ \ U_i = 5.52\ \text{eV})$ | $\lambda_L = 441.96$ nm | 2 steps |

Generally, the two-step scheme has lager ionization cross section than the three-step scheme. The two-step scheme of $\lambda_L$=441.96 nm of Nd is especially promising.

Figure 5:
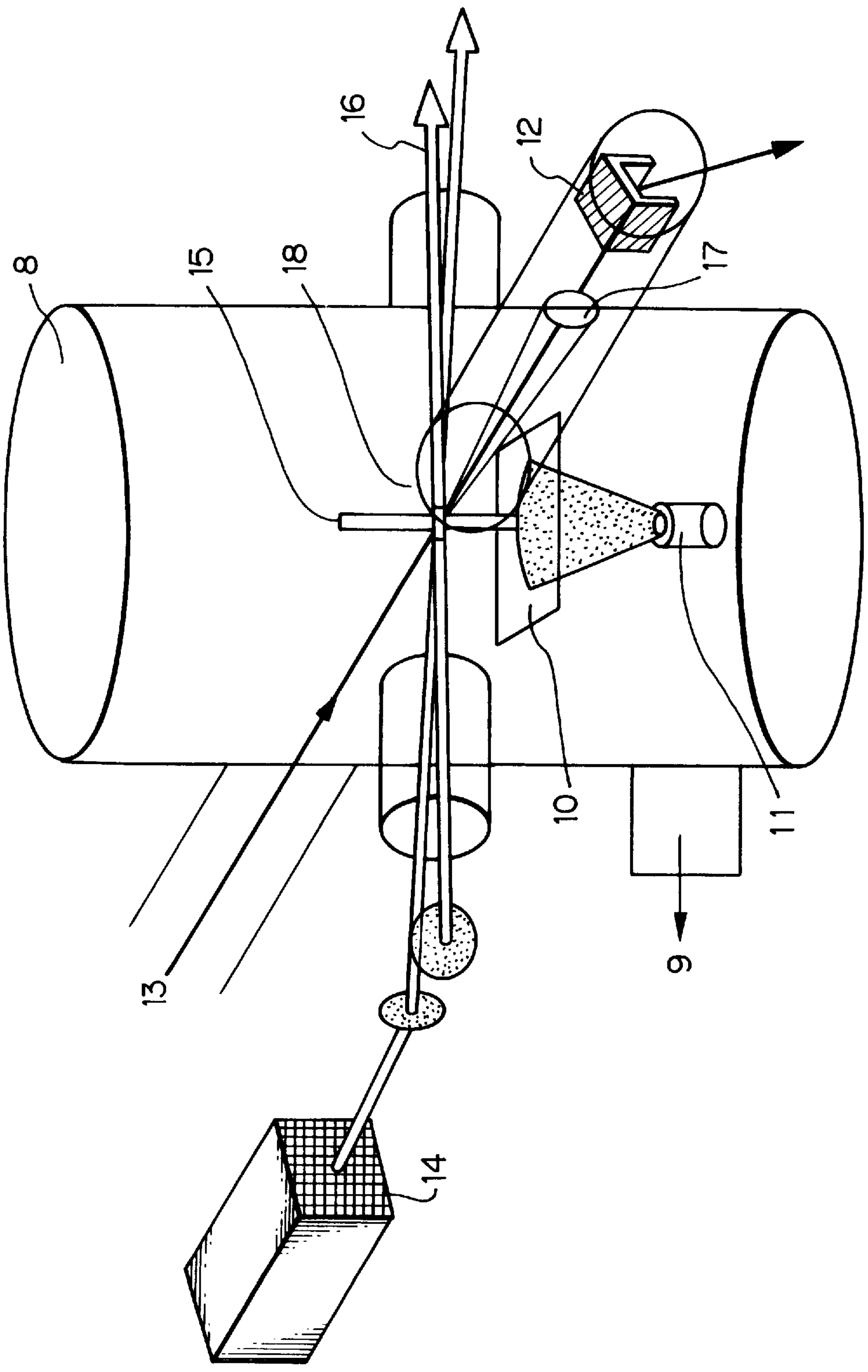
FIG. 5 is a drawing illustrating the outline of plasma micro-undulator by the laser-interference, resonance-ionization-method.
Figure 6:
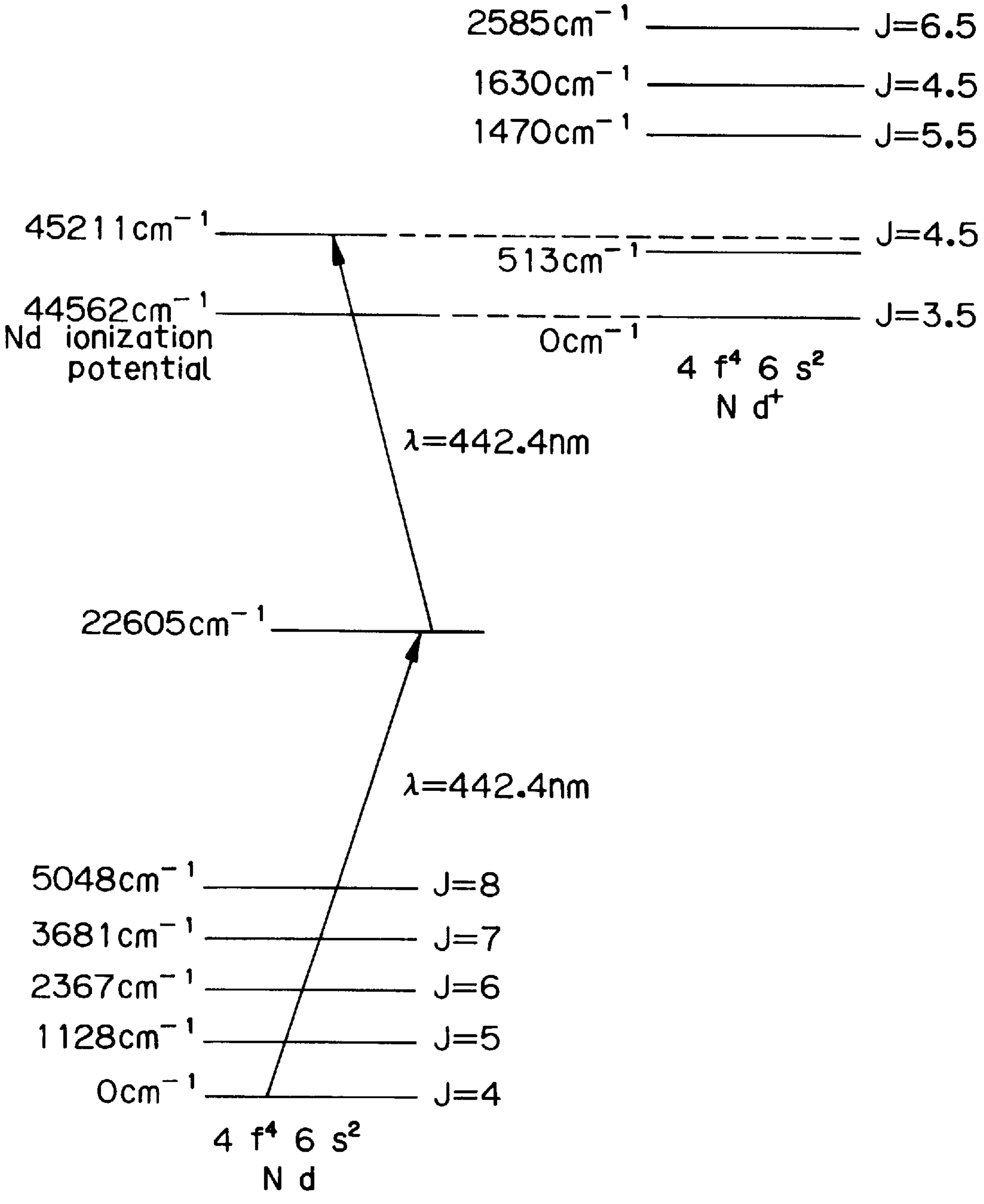
FIG. 6 is a drawing showing a scheme of one-wavelength, two-step resonance-ionization of neodymium.

Herein, the outline of experimental device is shown in FIG. 5 and an example of one-wavelength, two-step-ionization scheme is shown in FIG. 6.

In FIG. 5,

8 shows a vacuum vessel water-cooled;

9 is a vacuum exhausting system;

10 is an aperture plate;

11 is a vapor source;

12 is a bending magnet;

13 is a relativistic electron beam;

14 is a variable-wavelength laser;

15 is a vapor stream;

16 is a laser light damper;

17 is a synchrotron radiation; and

18 is a plasma micro-undulator.

That is, (1) setting up the vapor source 11 in the bottom of vacuum vessel 8 which the outer wall is water-cooled to produce a metal vapor stream;

(2) passing the vapor stream through the aperture plate 10 to make its lateral dimension about 1 cm×1 cm;

(3) injecting the relativistic electron beam 13 nearly perpendicular to the vapor stream 15 from an injection port; and (4) making two beams of variable wavelength laser 14 interfere in the vapor stream 15 utilizing the optical system shown in FIG. 3, herein, the wavelength of laser light is selected so as to resonantly ionize the vapor atom and a plasma density ripple is immediately formed to produce an undulator radiation by the mutual interaction with an electron beam; and (5) the electron beam is bended by the bending magnet 12 to be damped, but the synchrotron radiation is taken out through a window to be utilized.

Now, when incidenting a resonance laser light of $J_s$($Wm^{-2}$) in power density into a vapor stream of $n_0$($m^3$) in density and D (m) in size, with ionization of vapor atom, the power density of laser light changes as $$J(s)=J_s\ \exp\ [-s/l_i](l_i=1/n_n\sigma_i) \tag{15}$$

Herein, s is a distance along the laser light, $l_i$ is a mean free path of ionization $n_n$ is the density of vapor atoms and $\sigma_i$ is an ionization cross section.

On the other hand, a density of produced plasma $n_p$($m^3$) is given by $$n_p(s)=-[1/U_i][dJ(s)/ds].\tau_L=J(s)/U_iI_i].\tau_L \tag{16}$$

Therefore, in order to produce a high-density plasma efficiently with a given laser power, it is necessary to make $I_i$ small and $\tau_L$ large in the formula (16).

However, if making $l_i$ too small, there is a possibility that the spatial uniformity of plasma density which is essential for plasma micro-undulator may be lost.

Then, in the resonance ionization method, a strongly ionized plasma of $n_p$=$n_n$ is produced by making the laser energy density $J_0$-$\tau_L$ ($Jm^{-2}$) sufficiently large. In this time, since the spatial profile of plasma density reflects the profile of vapor density, it must be sufficiently uniform.

For example, the ionization energy necessary for producing Nd plasma of $10^{15}cm^{-3}$ in density and V=$D^3$=1 $cm^3$ in volume is $$n_pVU_i(Nd)=9\times10^{-4}\ (J).$$

The efficiency $\eta_L$ of ionization may reach from 0.1 to even 0.8~0.9 in the two-wavelength scheme. For example, when $\eta_L$=0.1, the laser energy required becomes 9 mJ.

This can be sufficiently attainable by the current technology of pulse dye lasers or solid state lasers.

Further, recently it has been found that, when using the two-wavelength, two-step scheme, i.e. first exciting an atom with one laser light, next ionizing it with another laser light and dividing this second ionizing laser light into laser lights to interefer, the density ripple is determined by the interference of this second ionizing laser.

Next, the problem on the formation of plasma micro-undulator of d=10~100 $\mu$m in periodic length and N=100~1000 in the number of period will be concretely discussed.

The plasma used is Nd plasma by the resonance ionization method of one-wavelength (441.96 nm) two-step scheme. Under the condition of $n_b$>$n_0$ (space chargeregion) and $n_b \leqq n_0$ (image charge region), equations of motion in case of incidenting uniform electron beam and short bunch beam are analyzed and the formula of undulator constant K and necessary plasma density $n_p$ are obtained. Results are shown in Table 1.

Repetition Rate of Undulator

The plasma micro-undulator is considered to be broken once it interacts with an electron beam. The upper limit of repetition rate of undulator can be determined from the time interval when the density ripple is produced. The plasma

TABLE 1

| | Short Bunch | | Long Bunch | | Uniform Beam | |
|---|---|---|---|---|---|---|
| | K = 0.1 | K = 1 | K = 0.1 | K = 1 | K = 0.1 | K = 1 |
| d = 10 μm | $r_o$ = 1 μm<br>$n_p = 7 \times 10^{13}$ cm$^{-3}$ | $r_o$ = 1 μm<br>$n_p = 7 \times 10^{14}$ cm$^{-3}$ | $L_0$ = 100 μm<br>$r_o$ 1 μm<br>$n_p = 2 \times 10^{14}$ cm$^{-3}$ | $L_0$ = 100 μm<br>$r_o$ 1 μm<br>$n_p = 2 \times 10^{15}$ cm$^{-3}$ | $n_p = 2 \times 10^{15}$ cm$^{-3}$ | $n_p = 2 \times 10^{16}$ cm$^{-3}$ |
| d = 100 μm | $r_o$ = 10 μm<br>$n_p = 7 \times 10^{11}$ cm$^{-3}$ | $r_o$ = 10 μm<br>$n_p = 7 \times 10^{12}$ cm$^{-3}$ | $L_0$ = 1 mm<br>$r_o$ 10 μm<br>$n_p = 2 \times 10^{12}$ cm$^{-3}$ | $L_0$ = 1 mm<br>$r_o$ 10 μm<br>$n_p = 2 \times 10^{13}$ cm$^{-3}$ | $n_p = 2 \times 10^{13}$ cm$^{-3}$ | $n_p = 2 \times 10^{14}$ cm$^{-3}$ |
| d = 1 mm | $r_o$ = 100 μm<br>$n_p = 7 \times 10^{9}$ cm$^{-3}$ | $r_o$ = 100 μm<br>$n_p = 7 \times 10^{10}$ cm$^{-3}$ | $L_0$ = 10 mm<br>$r_o$ 100 μm<br>$n_p = 2 \times 10^{10}$ cm$^{-3}$ | $L_0$ = 10 mm<br>$r_o$ 100 μm<br>$n_p = 2 \times 10^{11}$ cm$^{-3}$ | $n_p = 2 \times 10^{11}$ cm$^{-3}$ | $n_p = 2 \times 10^{12}$ cm$^{-3}$ |

That is, Table 1 shows the relation of undulator constant K to periodic length d and plasma density $n_p$, where $r_0$ and $L_0$ are radius and length of electron beam, respectively.

Since the radiation intensity of undulator is in proportion to $K^2$, it leads to an inefficient device to take K too small.

It is understood from Table 1 that, for typical value of K=0.1, if a plasma of $10^{15}$cm$^{-3}$ in maximum can be produced, all conditions are satisfied.

As described above, it is possible to produce a plasma of density $10^{15}$cm$^{-3}$ using a laser.

Life Time of Plasma Density Ripple

The electron temperature of resonance-ionization plasma is quite low as 0.01~0.05 eV so that it can be neglected in comparison with ion temperature. Furthermore, the ion temperature equals to vapor temperature. The vapor temperature is determined in the process of expansion and cooling of meatal vapor stream from evaporation source (about 2000K) and it is typically about 500K. The life time $\tau_r$ of density ripple can be considered as a time that an ion runs ½ of periodic length with thermal velocity.

On the other hand, the pulse width of laser light is limited by $\tau_r$ as $$\tau_L < \tau_r = 0.5d/u_{ith} = 0.5d/\sqrt{T_i}\ /M_i \quad (19)$$

They are estimated to be 30 ns for d=10 μm, 150 ns for d=50 μm and 300 ns for d=100 μm and considered to be sufficiently realized. And the vapor temperature can be further lowered by design of vapor source.

Attenuation of Electron Beam by Collision with Vapor

Rutherford scattering is predominant in the scattering of high energy electron and its cross section is given by $$\sigma_R = 4\pi Z_u^{\,2} r_e^{\,2}/\gamma^2\theta^2 \quad (20)$$

For example, on the assumption that γ=40 (20 MeV), $Z_a$=41, vapor atom density $n_0=3\times10^{16}$cm$^{-3}$ (1 Torr), L=1 cm and θ=beam radius 50 μm/L=1/100, the attenuation ratio of electron beam $\Delta n_c/n_c$ is $$\Delta n_c/n_c = \sigma_R n_0 L = 3\times10^{-2} \quad (21)$$

Since it is sufficiently small even in 1 Torr of vapor pressure, the influence of scattering can be said to be negligible.

flows upwards with the same velocity of vapor $u_s$=700~1000 m/s. Therefore, the time for which this plasma flows out from the interference region (~D) is $D/u_s$.

The time of plasma production by laser corresponds almost to pulse width $\tau_r$ which is negledibly small in comparison with $D/u_0$ and so, after all its reciprocal number $u_0/D$ gives the repetition rate.

When $$D = 1\text{ cm},\ u_o = 1000\text{ m/s},\quad f = u_o/D = 100\text{ (kHz)} \quad (22)$$

Since the repetition rate of tunable laser (dye laser, titanium sapphire laser, etc.) which is available at the present time does not reach 100 k Hz, the formula (22) can be said to be a sufficient value.

As a result of discussion on the problem for reallizing a plasma micro-undulator of D<1 cm in size, d=10~100 μm in periodic length and N=100~1000 in number of period, it has been understood that the energy and wavelength of laser beam, optical system, life of density ripple, electron loss by scattering and repetition rate all can be attained by the present technology.

What is claimed is:

1. A method of forming synchrotron radiation by a plasma micro-undulator, comprising the steps of:

illuminating a neutral gas by a laser to produce a plasma by photoionization;

forming an interference pattern between two beams generated by said laser having the same wavelength, wherein said step of forming an interference pattern occurs simultaneously with said step of illuminating a neutral gas; and producing a regular plasma-density ripple from the interaction of said plasma and said interference pattern to thereby form a plasma micro-undulator.

2. The method of forming synchrotron radiation by a plasma micro-undulator as set forth in claim 1, further comprising the steps of:

illuminating a vaporized atom generated from a high temperature evaporation source by said laser, said laser having a variable wavelength;

adjusting said wavelength of said laser to an excitation energy of said vaporized atom, wherein said step of illuminating said vaporized atom occurs simultaneously with said step of adjusting said wavelength; and producing a regular plasma-density-ripple corresponding to said interference pattern.

3. The method of forming synchrotron radiation by a plasma micro-undulator as forth in claim 2, further comprising the steps of:

dividing two parallel beams of said laser into a first beam and a second beam using a half mirror and a full reflection mirror, said laser having a single wavelength and said first beam and said second beam having the same intensity; and crossing said first beam and said second beam at a small angle in order to generate said interference pattern.

* * * * *